(12) United States Patent
Fujita

(10) Patent No.: US 6,333,915 B1
(45) Date of Patent: Dec. 25, 2001

(54) ON-LINE LINE MONITOR SYSTEM

(75) Inventor: Yoshitaka Fujita, Tokyo (JP)

(73) Assignee: NEC Corparation, Tokyo (JP)

( * ) Notice: Subject to any disclaimer, the term of this patent is extended or adjusted under 35 U.S.C. 154(b) by 0 days.

(21) Appl. No.: 09/109,050

(22) Filed: Jul. 2, 1998

(30) Foreign Application Priority Data

Jul. 3, 1997 (JP) .................................................. 9-178103

(51) Int. Cl.$^7$ .................................................. G01R 31/08
(52) U.S. Cl. ......................... 370/223; 370/228; 370/248
(58) Field of Search .................................. 370/216–228, 370/242, 243, 244, 246, 247, 248, 250, 252, 395, 241.1; 709/239, 238, 224

(56) References Cited

U.S. PATENT DOCUMENTS

| 5,459,718 | 10/1995 | Kusano | 370/16 |
|---|---|---|---|
| 5,621,722 | * 4/1997 | Edmaier et al. | 370/390 |
| 5,715,237 | * 2/1998 | Akiyoshi | 370/228 |
| 5,953,318 | * 9/1999 | Nattkemper et al. | 370/236 |

FOREIGN PATENT DOCUMENTS

| 57-92945 | 6/1982 | (JP) . |
|---|---|---|
| 57-99056 | 6/1982 | (JP) . |
| 60-74843 | 4/1985 | (JP) . |
| 61-18241 | 1/1986 | (JP) . |
| 62-42639 | 2/1987 | (JP) . |
| 62-279752 | 12/1987 | (JP) . |
| 63-60940 | 11/1988 | (JP) . |
| 2-177729 | 7/1990 | (JP) . |
| 4-51723 | 2/1992 | (JP) . |
| 5-63720 | 3/1993 | (JP) . |
| 5-167597 | 7/1993 | (JP) . |
| 5-227117 | 9/1993 | (JP) . |
| 5-292112 | 11/1993 | (JP) . |
| 6-164622 | 6/1994 | (JP) . |
| 6-311541 | 11/1994 | (JP) . |
| 7-107524 | 4/1995 | (JP) . |
| 8-172485 | 7/1996 | (JP) . |

OTHER PUBLICATIONS

"UTOPIA, An ATM–PHY Interface Specification Level 1, Version 2.01", The ATM Forum, Mar. 21, 1994.
"ATM User–Network Interface (UNI) Specification, Version 3.1", The ATM Forum, Sep. 1994.

* cited by examiner

Primary Examiner—David R. Vincent
(74) Attorney, Agent, or Firm—Foley & Lardner

(57) ABSTRACT

An on-line line monitor system is provided for fault diagnosis of signal processing blocks, which perform cross-connecting of ATM cells by using at least reception-side memory blocks, a SRAM block and transmission-side memory blocks under control of a CPU block with respect to an operating line system, which is presently placed in an on-line state to be in communication service, and a spare line system which is placed in a standby state to be out of the communication service. Test ATM cells are sequentially input to the signal processing blocks, in which they are processed and are then output together with normal ATM cells. By comparing the processed test ATM cell with the original test ATM cell, it is possible to determine occurrence of fault in the signal processing blocks. When the fault is detected with respect to the operating line system, line control is switched over to the spare line system. In addition, the on-line line monitor system monitors a pileup state of the normal ATM cells in the SRAM block. So, a rate of the test ATM cells to be sequentially input to the signal processing blocks is adjusted in response to the pileup state.

7 Claims, 8 Drawing Sheets

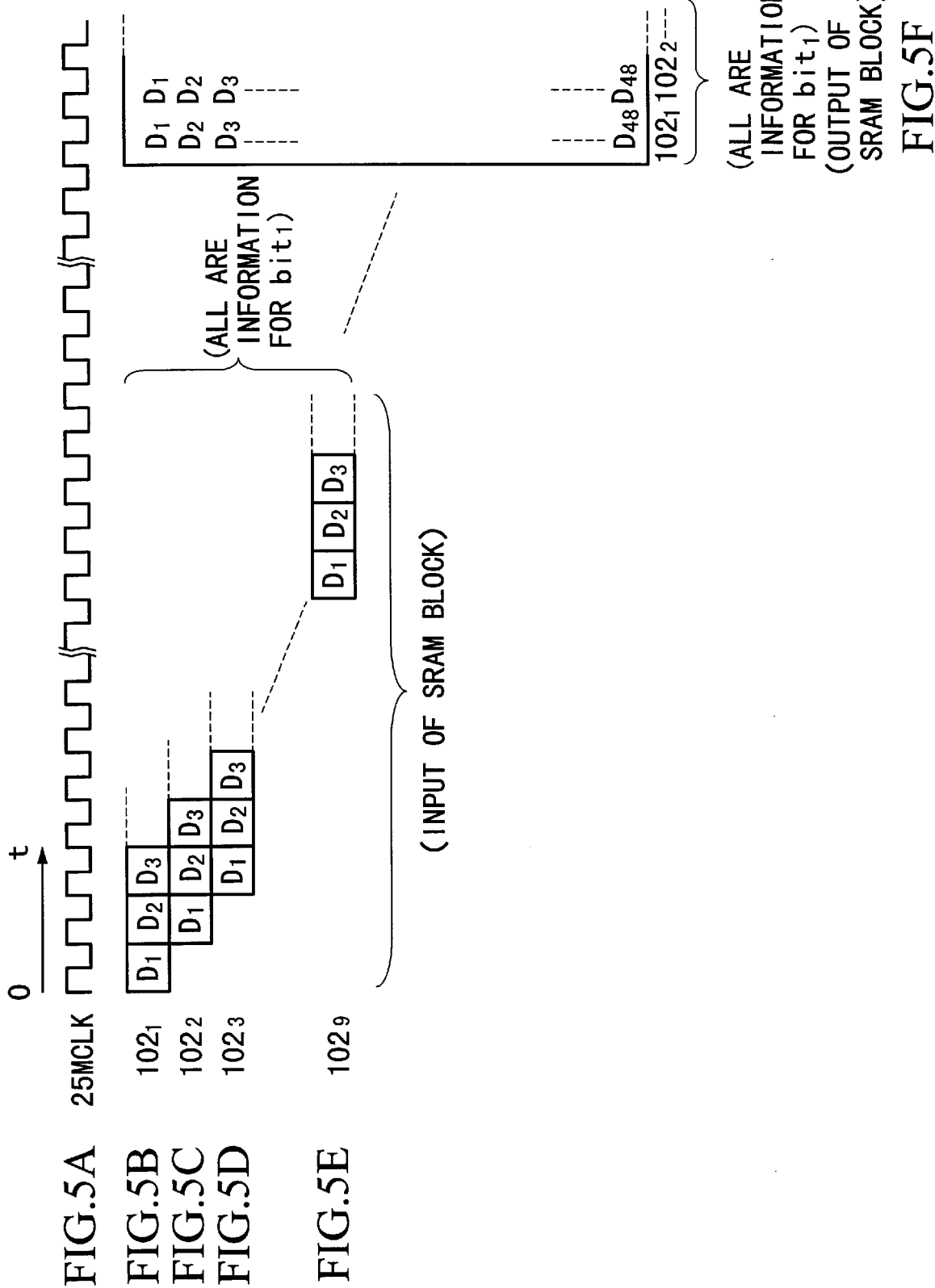

(WRITE TO SRAM BLOCK)

(READ FROM SRAM BLOCK)

ON-LINE LINE MONITOR SYSTEM

BACKGROUND OF THE INVENTION

1. Field of the Invention

This invention relates to on-line line monitor systems used for monitoring ATM cross-connect equipments, which perform cross-connecting with respect to ATM cells (where "ATM" is an abbreviation for "Asynchronous Transfer Mode"). Particularly, this invention relates to the on-line line monitor system that performs fault diagnosis with respect to circuit blocks provided for the cross-connecting. This application is based on patent application No. Hei 9-178103 filed in Japan, the content of which is incorporated herein by reference.

2. Description of the Related Art

The communication networks having redundancy configurations provide presently operating lines (or presently activated lines which are presently placed in an on-line state; hereinafter, simply referred to as operating lines) and spare lines (which are not presently used and are placed in an off-line state or a standby state). When faults occur on the operating lines, the communication networks switch over the operating lines to the spare lines. In an event of occurrence of a large fault in the above communication network, the operating line is subjected to shutoff, so that an input shutoff event occurs. In such an event, the communication network uses the fault as a trigger to switch over line control from the operating line to the spare line.

FIG. 8 shows a conventional example of the on-line line monitor system, which is disclosed by the paper of Japanese Patent Application, Publication No. Hei 4-51723. Herein, there are provided a first line switching equipment 13 and a second line switching equipment 14, which are connected together by an operating line 11 and a spare line 12. The second line switching equipment 14 contains a test signal generation circuit 16 and a test signal detection circuit 17. Herein, the test signal generation circuit 16 sends test signals to a first terminal of the spare line 12, while the test signal detection circuit 17 receives the test signals returned to a second terminal of the spare line 12 so as to detect a state of the spare line 12. In addition, the second line switching equipment 14 contains switched connections 18 to 21. The switched connection 18 is controlled by a first switch (not shown) that performs switching of the line for transmission and reception of the test signals, while the switched connections 19 to 21 are controlled by a third switch (not shown) that performs switchover between the operating line 11 and the spare line 12.

The first line switching equipment 13 provides a second switch (not shown) that switches over the line used for transmission and reception of the test signals in response to the first switch, as well as a fourth switch (not shown) that switches over line control between the operating line 11 and the spare line 12. In addition, a loopback circuit 24 having a switched connection 23 is provided for the second switch to turn back the test signals, while the fourth switch has switched connections 25 to 27.

In the aforementioned on-line line monitor system normally uses the operating line 11. For this reason, the aforementioned switches establish connections shown in FIG. 8. That is, the fourth switch of the first line switching equipment 13 establishes connections between the switched connections 25 and 26, while the third switch of the second line switching equipment 14 establishes connections between the switched connections 19 and 20. With respect to the spare line 12, the second switch of the first line switching equipment 13 establishes connections between the switched connections 23 and 27, while the first switch of the second line switching equipment 14 establishes connections between the switched connections 18 and 21. Thus, the spare line 12 is placed in a loopback state in the first line switching equipment 13, so that test signals, which are generated by the test signal generation circuit 16 of the second line switching equipment 14 and are transmitted onto the spare line 12, are returned back to the test signal detection circuit 17. The test signal detection circuit 17 examines quality of transmission characteristics of the spare line 12. In the case of defective, the on-line line monitor system gives warning. In this case, a maintenance man repairs the spare line 12, so that the spare line 12 can be normally retained in a normal state.

FIG. 9 shows connections that take place when a fault occurs on the operating line 11 so that the on-line line monitor system switches over the operating line 11 to the spare line 12, wherein parts identical to those of FIG. 8 are designated by the same reference symbols. As shown in FIG. 9, the on-line line monitor system establishes connections between the operating line 11, the test signal generation circuit 16 and the test signal detection circuit 17. Thus, the maintenance man is capable of knowing characteristics of the operating line 11 which causes the fault.

FIG. 10 shows another conventional example of the on-line line monitor system, which is disclosed by the paper of Japanese Patent Application, Publication No. Sho 62-279752. This system is applied to the double loop optical communication network, which is configured by double loop circuits (hereinafter, referred to as 0-loop and 1-loop respectively). There are provided a 0-loop light transmission path 40 and a 1-loop light transmission path 41, which correspond to light loops. A central control unit 31 contains a system control section 32 which is provided for both of the light loops, as well as a central control section 33 for the 0-loop and a central control section 34 for the 1-loop. In addition, the double loop optical communication network of FIG. 10 contains terminal devices 35, 36 and 37, which are arranged along the light loops in connection with the central control unit 31. So, the central control unit 31 is connected to the terminal devices 35 to 37 by means of the 0-light-transmission path 40 and the 1-light-transmission path 41. The terminal devices 35, 36 and 37 contain terminal control sections 43, 44 and 45 for the 0-loop as well as terminal control sections 46, 47 and 48 for the 1-loop respectively. The central control section 33 and the terminal control sections 43 to 45, all of which are provided for the 0-loop, are connected together in loop configuration by means of the 0-loop light transmission path 40. In addition, the central control section 34 and the terminal control sections 46 to 48, all of which are provided for the 1-loop, are connected together in loop configuration by means of the 1-loop light transmission path 41. Transmission direction of the 0-loop light transmission path 40 is reverse to that of the 1-loop light transmission path 41. The central control unit 31 subjects a prescribed bit pattern of a specific channel to inverse double transmission, so that the central control unit 31 normally sends the bit pattern on the light transmission paths.

FIG. 11 shows an error event that a bit error occurs on a certain light transmission path, wherein parts identical to those of FIG. 10 are designated by the same reference symbols. In FIG. 11, a mark of "X" indicates a fault location 51, which is placed between the terminal devices 35 and 36. Either the terminal device 35 or the terminal device 36 detects occurrence of malfunction, which continuously occurs R times or more, with respect to the bit pattern output from the central control device 31. That is, the terminal control section 44 of the terminal device 36 detects malfunction that occurs on the 0-loop light transmission path 40, while the terminal control section 46 of the terminal device 35 detects malfunction that occurs on the 1-loop light transmission path 41. Upon detection of the malfunction, either the terminal device 35 or the terminal device 36 performs loopback operation. Further, the system control section 32 of the central control unit 31 issues a bypass instruction or a loopback instruction to the central control section 33 for the 0-loop and the central control section 34 for the 1-loop, so that as shown by dotted lines, the double loop configuration is changed to a single loop configuration.

The aforementioned on-line line monitor systems shown in FIG. 8, FIG. 9, FIG. 10 and FIG. 11 are designed as follows:

When some large fault occurs on the operating line, the system uses such a fault as a trigger to switch over line control from the operating line to the spare line.

However, the aforementioned systems do not employ a method that test signals are incorporated into signals transmitted on the operating line, which is presently used for the communication service, so as to make determination as to whether the operating line has a fault or not. Because, the conventional communication systems mainly uses STM (an abbreviation for "Synchronous Transfer Mode"). So, it is impossible to incorporate the test signals into actual communication signals without breaking the communication services.

As the method to check the operating line, the conventional system employs a method that adds a parity to signals, which are processed by every unit of byte. According to this method, it is possible to detect occurrence of error in the signals by the parity check that is performed at a reception side to receive the signals. In this method, in which a parity bit is configured by a single bit, however, if error corresponding to two bits in total occurs on the line, it is impossible to make determination as to whether the line has a fault or not. In addition, it is impossible to perform fault diagnosis with respect to all the circuits by merely using the parity check. For this reason, it can be said that the parity check is insufficient to make determination as to whether a fault occurs in the circuit operation or not. Further, if a number of parity bits is increased, the system suffers from a problem that a circuit portion for processing communication information should be enlarged in scale in response to an increase of the parity bits.

SUMMARY OF THE INVENTION

It is an object of the invention to provide an on-line line monitor system that is capable of performing fault diagnosis of circuit blocks used for cross-connecting by using test signals, which are incorporated into signals transmitted on an operating line and a spare line.

It is another object of the invention to provide an on-line line monitor system that when a fault is detected on an operating line, is capable of switching over line control from the operating line to a spare line without substantially breaking communication service.

An on-line line monitor system is provided for fault diagnosis of signal processing blocks, which perform cross-connecting of ATM cells by using at least reception-side memory blocks, a SRAM block and transmission-side memory blocks under control of a CPU block with respect to an operating line system, which is presently placed in an on-line state to be in communication service, and a spare line system which is placed in a standby state to be out of the communication service.

Test ATM cells are sequentially input to the signal processing blocks, in which they are processed and are then output together with normal ATM cells. By comparing the processed test ATM cell with the original test ATM cell which has not been input to the signal processing blocks yet, it is possible to determine occurrence of fault in the signal processing blocks. That is, if the data section of the processed test ATM cell is not identical to the data section of the original test ATM cell, (i.e., a test ATM cell before processing), the on-line line monitor system determines occurrence of fault in the signal processing blocks.

When the fault is detected with respect to the operating line system, line control is switched over to the spare line system, so that the spare line system is now placed in an on-line state. In addition, the on-line line monitor system monitors a pileup state of the normal ATM cells in the SRAM block. So, a rate of the test ATM cells to be sequentially input to the signal processing blocks is adjusted in response to the pileup state.

Incidentally, one of the reception-side memory blocks is used exclusively for inputting the test ATM cells, while one of the transmission-side memory blocks is used exclusively for separating the processed ATM cells from the normal ATM cells. Herein, the CPU block outputs the test ATM cell and then receives the processed test ATM cell so as to make the fault determination.

BRIEF DESCRIPTION OF THE DRAWINGS

These and other objects, aspects and embodiment of the present invention will be described in more detail with reference to the following drawing figures, of which:

FIG. 5A shows an output waveform of system clock;

FIG. 5B, FIG. 5C, FIG. 5D and FIG. 5E are timing charts showing input/output manners of data with respect to a first serial-parallel block shown in FIG. 1 in synchronization with the system clock of FIG. 5A;

FIG. 5F shows an expanded form of a data section of an ATM cell subjected to multiplex separation with regard to $bit_1$;

DESCRIPTION OF THE PREFERRED EMBODIMENT

The on-line line monitor system is provided for diagnosis of signal processing blocks that input multiple ATM cell streams for the asynchronous transfer mode within signal frames, which are transmitted thereto over multiple transmission lines in accordance with the synchronous transfer mode, so as to perform the cross-connecting with respect to each unit of the ATM cell within the multiple ATM cell streams.

Figure 1:
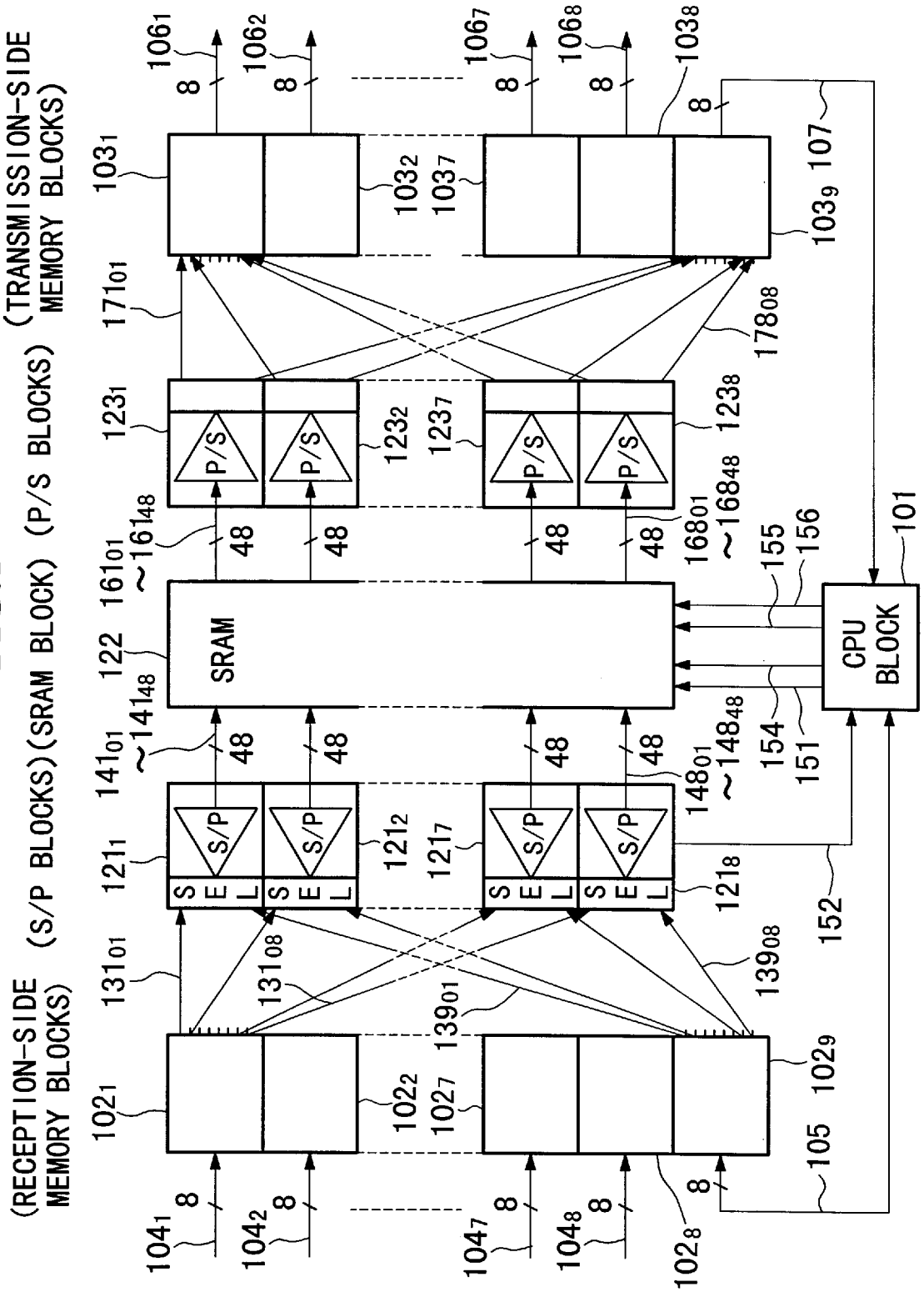
FIG. 1 is a block diagram showing a configuration of signal processing blocks, which are monitored by an on-line line monitor system in accordance with a preferred embodiment of the invention.

FIG. 1 shows a configuration for signal processing blocks, which are objects monitored by an on-line line monitor system according to a preferred embodiment of the invention. In FIG. 1, there are provided a CPU block 101 (where "CPU" is an abbreviation for "Central Processing Unit") as well as nine reception-side memory blocks $102_1$ to $102_9$ and nine transmission-side memory blocks $103_1$ to $103_9$. Herein, first to eighth reception-side memory blocks $102_1$ to $102_8$ correspond to eight input ports respectively, so they are capable of storing first to eighth input signals (i.e., normal ATM cells) $104_1$ to $104_8$ respectively. Each of the input signals is configured by 8-bit parallel signal. Ninth reception-side memory block $102_9$ inputs 8-bit parallel input signal 105, representing a test ATM cell, which is output from the CPU block 101. First to eighth transmission-side memory blocks $103_1$ to $103_8$ correspond to eight input ports respectively. So, first to eighth output signals $106_1$ to $106_8$ are respectively read from the memory blocks $103_1$ to $103_8$. Each of the output signals is configured by 8-bit parallel signal. 8-bit parallel signal 107, representing a test ATM cell, is read from ninth transmission-side memory block $103_9$ and is input to the CPU block 101.

An input/output throughput for each port is 155 Megabit/second, while the signals correspond to continuing ATM cells. The aforementioned input signals $104_1$ to $104_8$ are asynchronous with each other, so each of them has different timing. Each of the first to eighth input signals $104_1$ to $104_8$ has 8-bit parallel configuration, whose speed per one bit is 19.44 MHz. This specification is similarly applied to the input signal 105, which is transmitted from the CPU block 101 to the ninth reception-side memory block $102_9$.

Incidentally, an interface for the input signals in the present embodiment is compatible with "UTOPIA 1 interface", which is standardized by the ATM Forum. So, the first to eighth input signals $104_1$ to $104_8$ are subjected to synchronization according to one system clock. The system clock of the present embodiment has clock frequency of 25 MHz.

Between the reception-side memory blocks $102_1$ to $102_9$ and the transmission-side memory blocks $103_1$ to $103_9$, there are provided first to eighth serial-parallel blocks (denoted by "S/P") $121_1$ to $121_8$, a SRAM block 122 (where "SRAM" is an abbreviation for "Static Random-Access Memory") and first to eighth parallel-serial blocks (denoted by "P/S") $123_1$ to $123_8$.

Each of the reception-side memory blocks $102_1$ to $102_9$ stores the 8-bit input signal thereof so as to provide eight signals each corresponding to one bit. For example, the first reception-side memory block $102_1$ provides eight signals $131_{01}$ to $131_{08}$, while the ninth reception-side memory block $102_9$ provides eight signals $139_{01}$ to $139_{08}$. Those signals, which are separated from each other and are output from the first to ninth reception-side memory blocks $102_1$ to $102_9$, are delivered to the first to eighth serial-parallel blocks $121_1$ to $121_8$ with speed of 25 MHz. Herein, the signals $131_{01}$ to $139_{01}$ are delivered to the serial-parallel block $121_1$, while the signals $131_{08}$ to $139_{08}$ are delivered to the serial-parallel block $121_8$. The serial-parallel blocks $121_1$ to $121_8$ perform multiplex separation on the 8-bit parallel signals (i.e., $131_{01}$ to $131_{08}, \ldots, 139_{01}$ to $139_{08}$) in a time-division manner with respect to their memory blocks, so that the serial-parallel blocks $121_1$ to $121_8$ produce 48-bit signals (i.e., $141_{01}$ to $141_{48}, \ldots, 148_{01}$ to $148_{48}$) respectively. Those signals (i.e., $141_{01}$ to $141_{48}, \ldots, 148_{01}$ to $148_{48}$) are written into the SRAM block 122.

A write address signal 151 given from the CPU block 101 is input to the SRAM block 122. Incidentally, only when the serial-parallel blocks $121_1$ to $121_8$ provide an effective cell as a signal 152, a write pulse 154 of the CPU block 101 is input to the SRAM 122. As similar to a relationship between the write address signal 151 and the write pulse 154, a read address 155 and a read pulse 156 given from the CPU block 101 are input to the SRAM 122. Based on the read pulse 156, signals $161_{01}$ to $161_{48}, 162_{01}$ to $162_{48}, \ldots, 168_{01}$ to $168_{48}$ are read from the SRAM block 122. The read signals are forwarded to the parallel-serial blocks $123_1$ to $123_8$ respectively. So, the parallel-serial blocks $123_1$ to $123_8$ perform time-division multiplexing on those signals with respect to each unit of 48 bits.

As similar to the foregoing serial-parallel blocks $121_1$ to $121_8$, the parallel-serial blocks $123_1$ to $123_8$ sequentially process bit parallel signals, which are transmitted thereto in a time-division manner from the reception-side memory blocks $102_1$ to $102_9$, in accordance with a processing order from the first reception-side memory block $102_1$ to the ninth reception-side memory block $102_9$. Processing results correspond to signals $171_{01}$ to $171_{08}, 172_{01}$ to $172_{08}, \ldots, 178_{01}$ to $178_{08}$, which are respectively forwarded to the transmission-side memory blocks $103_1$ to $103_9$. As similar to the reception-side memory blocks $102_1$ to $102_9$, the transmission-side memory blocks $103_1$ to $103_9$ temporarily store those signals with respect to each unit of 8 bits. Then, the transmission-side memory blocks $103_1$ to $103_8$ output 8-bit parallel output signals $106_1$ to $106_8$ respectively. Incidentally, an interface for the output signals in the present embodiment is also compatible to the UTOPIA1 interface, which his standardized by the ATM Forum. The details of the UTOPIA1 interface are written on the paper of "UTOPIA, An ATM-PHY Interface Specification Levell, Ver. 2.01 3/21, 1994 by ATM Forum" (hereinafter, simply referred to as "paper 1").

Next, a description will be given with respect to a manner of conversion of signal formats between blocks shown in FIG. 1 as well as content of timing process that performs exchange with respect to the unit of ATM cell.

Figure 2:
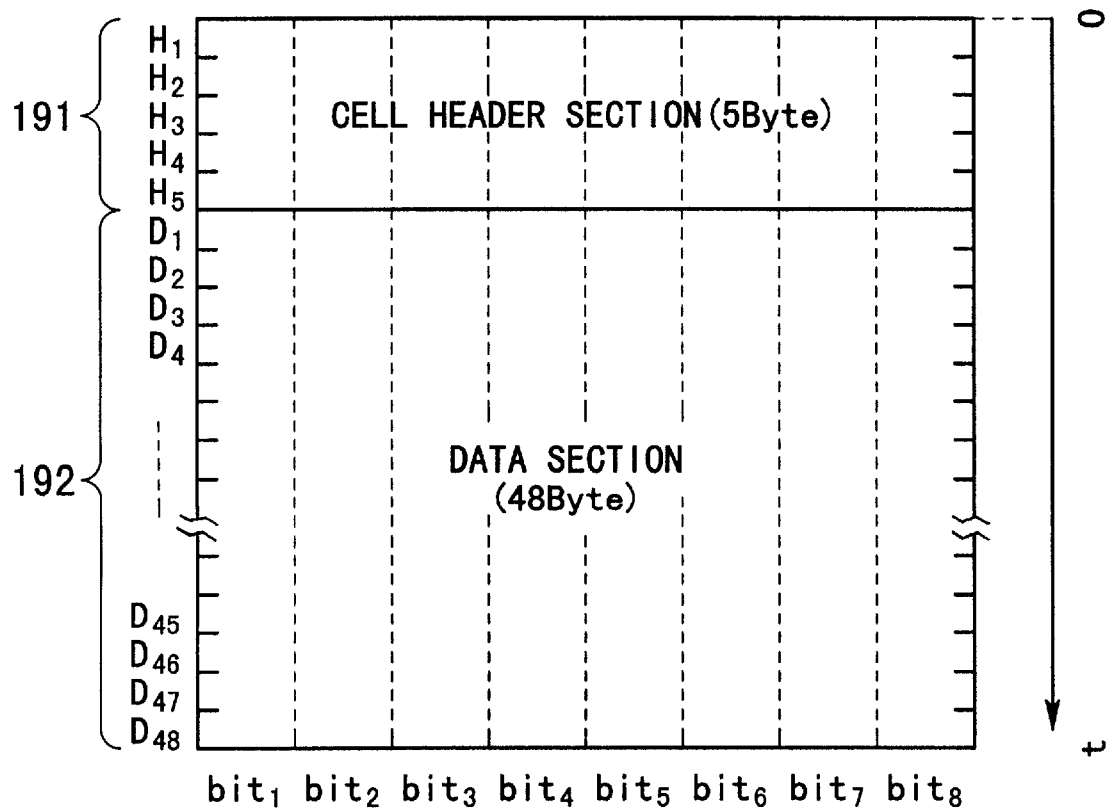
FIG. 2 shows an example of a configuration of an ATM cell, which is used in FIG. 1.

FIG. 2 shows a format of an ATM cell with respect to the first input signal $104_1$. Herein, the ATM cell is mainly configured by a cell header section 191 of 5 bytes and a data section 192 of 48 bytes. This format is standardized by the standardization parties such as ITU-T (where "ITU" is an abbreviation for "International Telecommunication Union") and ATM Forum, which provides the paper of "User-Network Interface (UNI) Specification, Ver. 3.1 Sep. 1994 by ATM Forum" (hereinafter, referred to as "paper 2"). Similar format of the ATM cell is applied to each of the input signals $104_2$ to $104_8$ and the input signal 105, which are input to the reception-side memory blocks $102_2$ to $102_9$ respectively. Incidentally, those input signals are input to the reception-side memory blocks in an asynchronous manner.

As described above, the 8-bit parallel input signal 105, which is formed in ATM cell configuration and is output from the CPU block 101, is written into the ninth reception-side memory block $102_9$. Incidentally, the same format of the above ATM cell format shown in FIG. 2 is applied to each of the output signals $106_1$ to $106_8$ as well.

Figure 3:
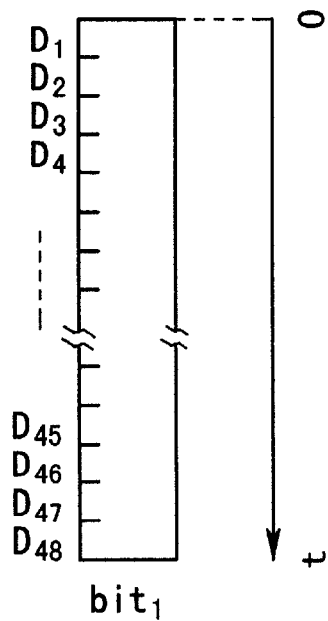
FIG. 3 shows a format for outputting signals.

The reception-side memory blocks $102_1$ to $102_9$ removes the cell header sections, each configured by 5 bytes, from the ATM cells input thereto, so that remained data sections, each configured by 48 bytes, are only forwarded to the serial-parallel blocks $121_1$ to $121_8$ as follows:

As shown in FIG. 2, the data section 192 of 48 bytes is resolved in such a way that a set of first data $D_1$ to forty-eighth data $D_{48}$ are assigned to each of a first bit "$bit_1$" to an eighth bit "$bit_8$". So, as shown in FIG. 3, a set of the data $D_1$ to $D_{48}$ are output with respect to each of the eight bits "$bit_1$" to "$bit_8$". Incidentally, the signals $171_{01}$ to $171_{08}$, $172_{01}$ to $172_{08}$, ..., $178_{01}$ to $178_{08}$ are configured to conform with the above format of FIG. 3 as well.

Figure 4:
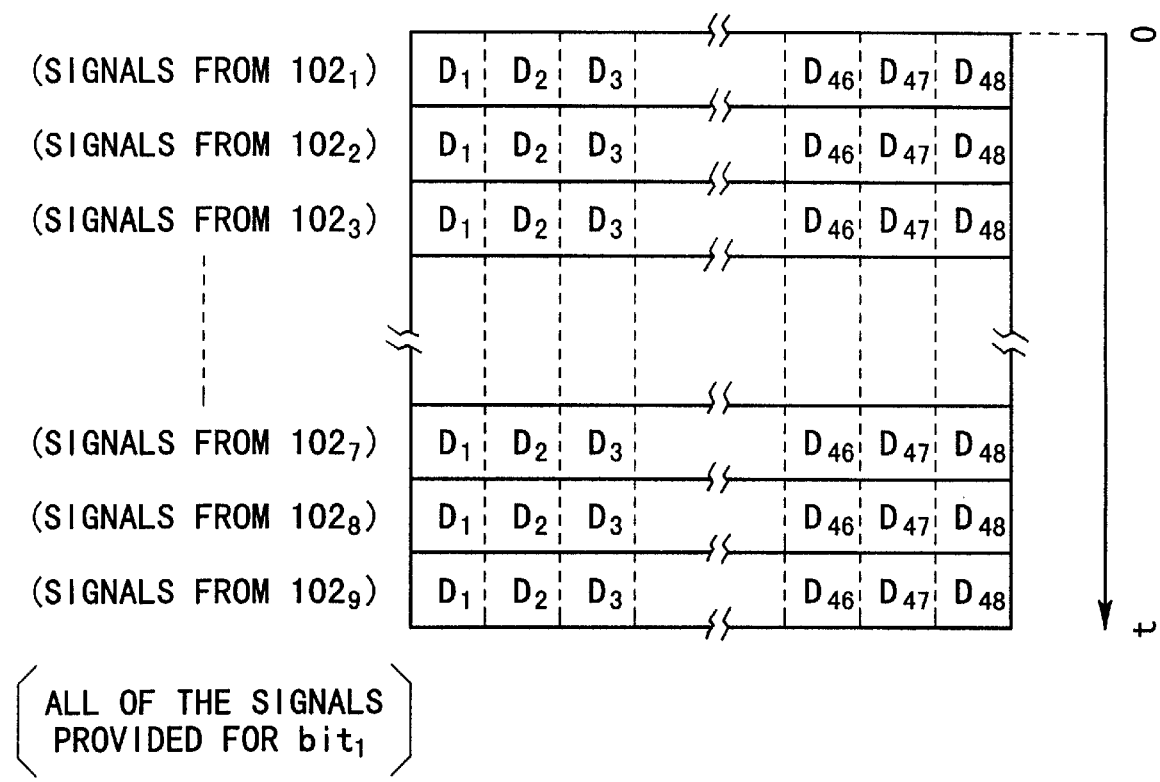
FIG. 4 shows a format for multiplex-separated signals.

The first serial-parallel block $121_1$ performs expansion of multiplex separation in a time-division manner on data regarding the first bit "$bit_1$", which are given from the reception-side memory blocks $102_1$ to $102_9$. Thus, the first serial-parallel block $121_1$ forms a set of the data in accordance with a format shown in FIG. 4. Those data are output to the SRAM block 122 with regard to each unit of 48 bits. As described before, the SRAM block 122 is provided to process the signals $141_{01}$ to $141_{48}$ output from the first serial-parallel block $121_1$ as well as the other signals $142_{01}$ to $142_{48}$, ..., $148_{01}$ to $148_{48}$, which are respectively output from the second to eighth serial-parallel blocks $121_2$ to $121_8$ respectively. Details of the processing will be described later. Incidentally, the same format of the format shown in FIG. 4 is applied to the signals $161_{01}$ to $161_{48}$, which are output from the SRAM block 122 to the first parallel-serial block $123_1$.

In the processes regarding the serial-parallel blocks $121_1$ to $121_8$, the data section 192 of 48 bytes of the ATM cell shown in FIG. 2 are provided as a range of 384 bits (=48×8), which are written into the SRAM block 122 in a multiplex-separated form. So, the ATM cells output from the reception-side memory blocks $102_1$ to $102_9$ in a time-division manner are sequentially written into the SRAM block 122.

Addresses of the SRAM block 122 are controlled by the CPU block 101. Upon receipt of the signal 152 declaring that the write address signal 151 and writing cell are effective, the CPU block 101 outputs the write pulse 154 to the SRAM block 122, so that in response to the read address 155 and read pulse 156, data exchange is performed with respect to information of 384 bits corresponding to the data section 192. Thus, the cross-connecting is performed by each unit of cell. In this case, the CPU block 101 grasps an amount of utilized memory capacity of the SRAM block 122.

The data sections (192) of the cells, which are subjected to cross-connecting, are read from the SRAM block 122 as the signals $161_{01}$ to $161_{48}$, $162_{01}$ to $162_{48}$, ..., $168_{01}$ to $168_{48}$. Thereafter, the signals are input to the parallel-serial blocks $123_1$ to $123_8$ by each unit of forty-eight signals, which are then subjected to forty-eight multiplexing in a time-division manner. Using the aforementioned format of FIG. 3, the signals $171_{01}$ to $171_{08}$, $172_{01}$ to $172_{08}$, ..., $178_{01}$ to $178_{08}$ are forwarded to the transmission side memory blocks $103_1$ to $103_9$ respectively. For example, the first parallel-serial block $123_1$ performs processing with respect to the first bit "$bit_1$" in the data section 192 of the ATM cell shown in FIG. 2. So, the first parallel-serial block $123_1$ performs multiplexing on the data sections (192) of the ATM cells, which are transmitted thereto from the nine reception-side memory blocks $102_1$ to $102_9$ in a time-division manner, with respect to the first bit "$bit_1$". Thus, results of the multiplexing are output to the nine transmission-side memory blocks $103_1$ to $103_9$ respectively.

Operations similar to the above operation of the first parallel-serial block $123_1$ are performed by the second to eighth parallel-serial blocks $123_2$ to $123_8$ respectively. Thereafter, processing is performed with respect to the second bit "$bit_2$" to the eight bit "$bit_8$" of the data section 192 of the ATM cell respectively. So, results are output to the transmission-side memory blocks $103_1$ to $103_9$ respectively.

The transmission-side memory blocks $103_1$ to $103_9$ format the signals $171_{01}$ to $171_{08}$, $172_{01}$ to $172_{08}$, ..., $178_{01}$ to $178_{08}$ output from the parallel-serial blocks $123_1$ to $123_8$ to conform with the configuration of the ATM cell shown in FIG. 2. For this reason, they add the cell header section 191 of 5 bytes shown in FIG. 2 to those signals so as to provide the first to eighth output signals $106_1$ to $106_8$, all of which have the signal interface compatible with the aforementioned UTOPIA1 interface standardized by the ATM Forum. Like the CPU block 101, an ATM cell is written into the ninth transmission-side memory block $103_9$.

In FIG. 1, the cross-connecting is performed in a time-division manner with respect to the unit of the ATM cell. Now, a description will be given with respect to the timing that the cross-connecting is performed. In the present embodiment of the on-line line monitor system which is described heretofore, all of the signals are processed in a time-division manner while being synchronized with the single system clock (25 MHz).

FIG. 5A to FIG. 5F show input/output manners of information with respect to the first serial-parallel block $121_1$. FIG. 5A shows an output waveform of the system clock (25 MHz). As shown in FIG. 5B to FIG. 5E, data sections (i.e., 192 shown in FIG. 2) of ATM cells are sequentially read from the first to ninth reception-side memory blocks $102_1$ to $102_9$ with respect to the first bit "$bit_1$", so they are input to the first serial-parallel block $121_1$. If information of the above data section is completely read from the memory block with respect to first data $D_1$ to forty-eighth data $D_{48}$ shown in FIG. 3, the first serial-parallel block $121_1$ outputs the information as data of 48 bits. That is, FIG. 5B to FIG. 5F show a process of 48-bit multiplex separation, which is performed with respect to the first bit "$bit_1$" of the data section 192 of the ATM cell (see FIG. 3). However, if an effective ATM cell, which should be read out, does not arrive the reception-side memory block, its data section is represented by "null", so no effective data are read from the memory block.

Figure 6A:
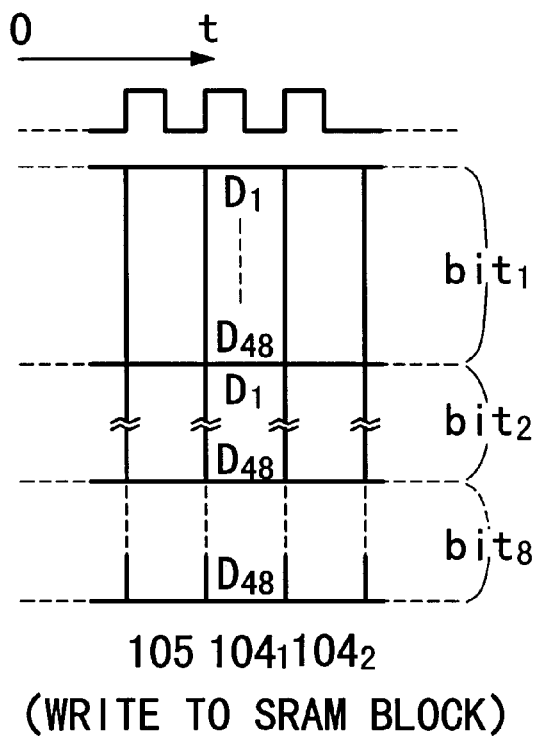
FIG. 6A shows an operation to write data of serial-parallel blocks into a SRAM block shown in FIG. 1.
Figure 6B:
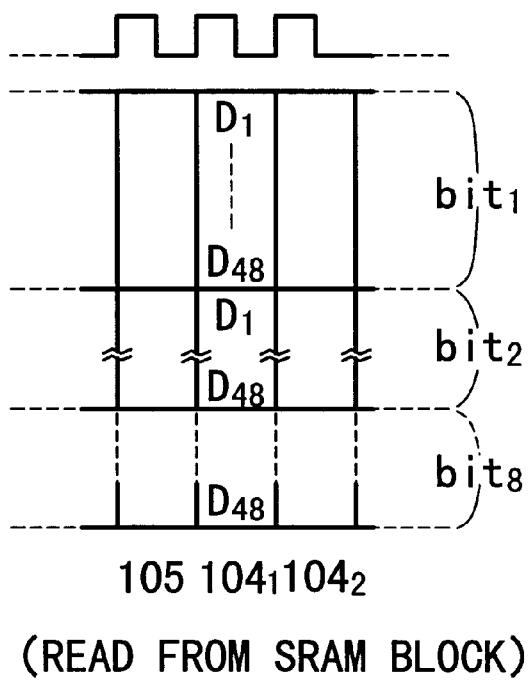
FIG. 6B shows an operation to read data from the SRAM block.

FIG. 6A shows an operation to write data of the serial-parallel blocks $121_1$ to $121_8$ into the SRAM block 122, while FIG. 6B shows an operation to read data from the SRAM block 122. Data of the reception-side memory blocks $102_1$ to $102_9$ are sequentially output from the serial-parallel blocks $121_1$ to $121_8$. Herein, the data section 192 of the ATM cell (see FIG. 2) is expanded as shown in FIG. 5F have a range of 384 bits (=48×8). Those data are sequentially written into the SRAM block 122 as shown in FIG. 6A. Then, they are read from the SRAM block 122 as shown in FIG. 6B. Incidentally, a lateral direction of FIG. 6A and FIG. 6B represents a lapse of time "t". As shown in FIG. 6A and FIG. 6B, there is provided a phase shift (or time difference) between the read operation and write operation. The write timing is synchronized with the timing to generate the write address signal 151 and the write pulse 154 as well as the system clock of 25 MHz, while the read timing is synchronized with the timing to generate the read address signal 155 and the read pulse 156 as well as the system clock of 25 MHz. Therefore, by merely changing addresses, it is possible to perform the cross-connecting with respect to the data section 192 of the ATM cell. Thus, it is possible to convert the input signals $104_1$ to $104_8$ and 105 to the "arbitrarily configured" output signals $106_1$ to $106_8$, to which the cell header section 191 is added.

Next, the parallel-serial blocks $123_1$ to $123_8$ perform operations, which are reverse to the operations of the serial-parallel blocks $121_1$ to $121_8$, so as to perform 48-bit multiplexing on the signals read from the SRAM block 122. Thus, the parallel-serial blocks $123_1$ to $123_8$ produce signals $171_{O1}$ to $171_{O8}$, $172_{O1}$ to $172_{O8}$, ..., $178_{O1}$ to $178_{O8}$, which are forwarded to the transmission-side memory blocks $103_1$ to $103_9$ respectively.

The present embodiment provides cross-connect circuit blocks, shown in FIG. 1, which perform processing with respect to each unit of the ATM cell, as follows:

ATM cell data, as normal signals, are input to the reception-side memory blocks $102_1$ to $102_8$ as the input signals $104_1$ to $104_8$, so that the transmission-side memory blocks $103_1$ to $103_8$ provides the output signals $106_1$ to $106_8$.

So, the CPU block 101 is capable of outputting a test ATM cell, having a prescribed pattern, as the input signal 105 without interrupting the ATM cell data exchange service. The data section 192 (see FIG. 2) of the test ATM cell is transmitted from the ninth reception-side memory block $102_9$ to the ninth transmission-side memory block $103_9$ through the serial-parallel blocks $121_1$ to $121_8$, the SRAM block 122 and the parallel-serial blocks $123_1$ to $123_8$ respectively. Then, it is returned to the CPU block 101 again. Thus, it is possible to periodically perform diagnosis of the circuit blocks by collation of the data section 192 of the test ATM cell, which is transmitted from and then returned to the CPU block 101.

Namely, if error is detected with respect only one bit of the data section 192 of the test ATM cell consisting of 384 bits, it is possible to determine that fault occurs on any one of the circuit blocks shown in FIG. 1. Incidentally, by changing an interval of time for transmission of the test ATM cells, it is possible to change a time required for fault determination. In addition, by calculating an effective number of cells and a memory size of the SRAM memory 122 in response to a pileup state of normal data cells in the SRAM block 122, it is possible to perform fault determination without causing congestion of the SRAM block 122. In other words, it is possible to adjust an amount (or rate) of the test ATM cells, which are sequentially input to the signal processing blocks, in response to the pileup state of the normal ATM cells.

Next, a description will be given with respect to a system application to which the present embodiment of the on-line line monitor system is applied.

Figure 7:
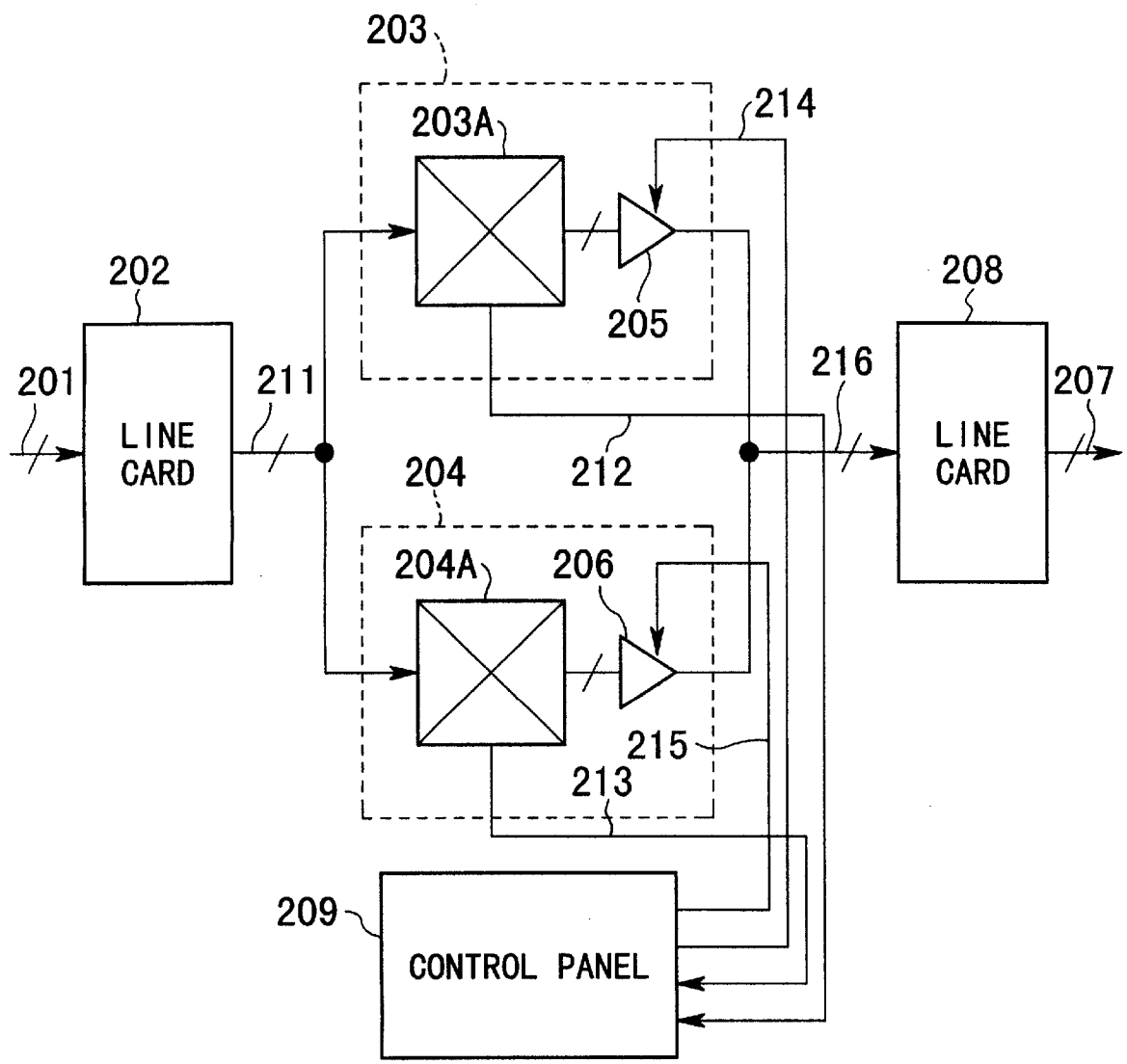
FIG. 7 is a block diagram showing an overall configuration of an ATM cross-connect equipment, which is monitored by the preferred embodiment of the on-line line monitor system.
Figure 8:
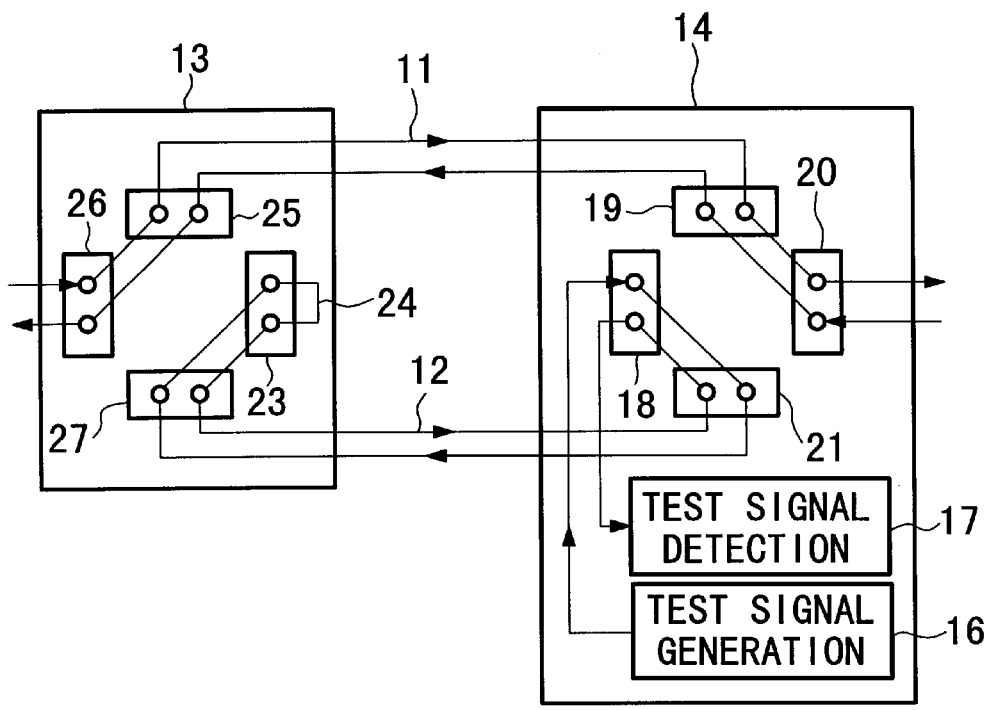
FIG. 8 shows a system configuration of an example of an on-line line monitor system.
Figure 9:
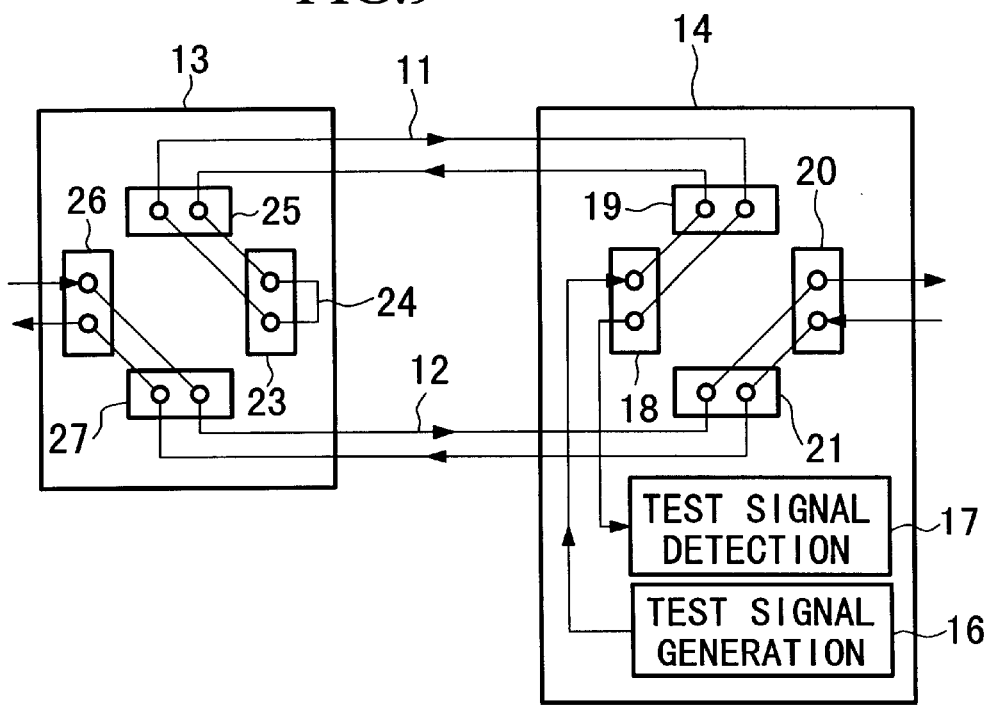
FIG. 9 shows a system configuration of the on-line line monitor system of FIG. 8 in which line switching is performed in response to occurrence of fault.
Figure 10:
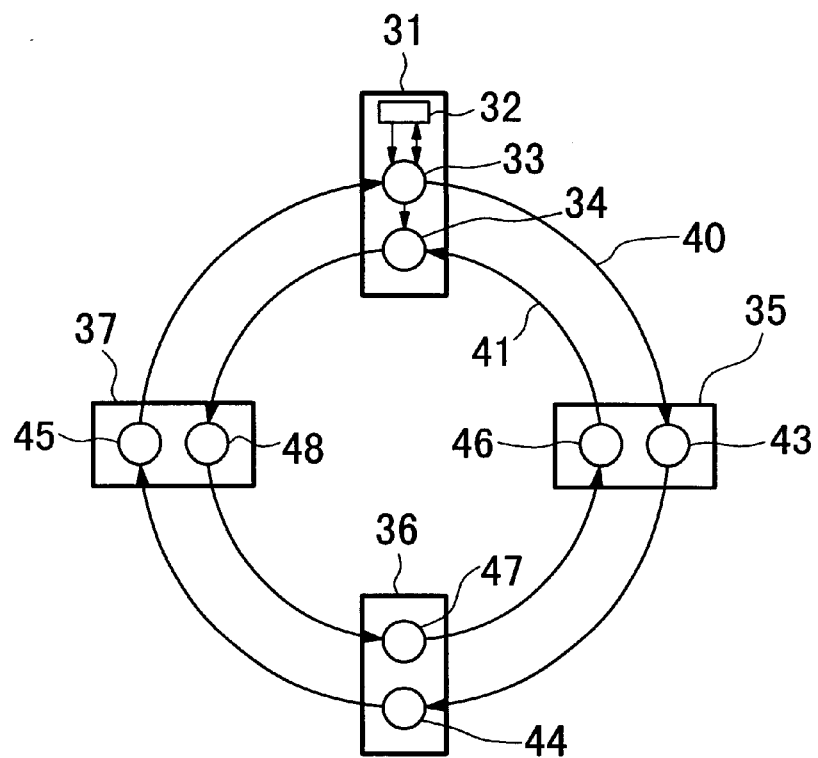
FIG. 10 shows a system configuration of another example of an on-line line monitor system.
Figure 11:
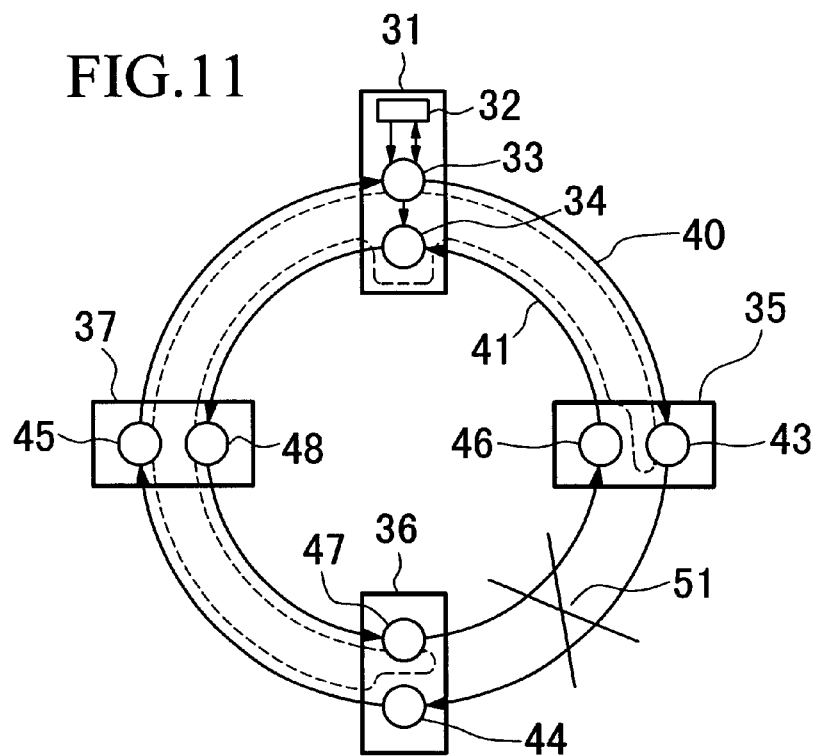
FIG. 11 shows a system configuration of the on-line line monitor system of FIG. 10 in which bit error occurs on a light transmission path.

FIG. 7 shows an overall configuration of an ATM cross-connect equipment. In FIG. 7, reference symbol "201" represents a number of STM-1 signals (where "STM" is an abbreviation for "Synchronous Transfer Mode"), which correspond to the interface standardized by the ITU-T or ATM Forum (which is discussed in connection with the aforementioned paper 2). A first line card 202 inputs the STM-1 signals 201 given from the external. The first line card 202 is followed by a pair of first and second ATM cross-connect panels 203 and 204, which are equipped with first and second tristate buffers 205 and 206 respectively. Herein, one of the tristate buffers 205 and 206 is made active. The ATM cross-connect panels 203 and 204 are followed by a second line card 208, which outputs STM-1 signals 207. Based on information given from first and second cross-connect blocks 203A and 204A provided in the first and second ATM cross-connect panels 203 and 204 respectively, a control panel 209 controls the first and second tristate buffers 205 and 206 respectively.

In the ATM cross-connect equipment of FIG. 7, the first line card 202 performs pointer process of the STM-1 signal 201 to remove its overhead section. Thus, the first line card 202 produces a pure ATM cell, which is output as a signal 211 compatible with the UTOPIA1 interface (which is discussed with the aforementioned paper 1) standardized by the ATM Forum. This signal 211 branches into two branch signals, which are respectively input to the first and second ATM cross-connect panels 203 and 204. The ATM cross-connect panels 203 and 204 contain the cross-connect blocks 203A and 204A whose internal configurations correspond to the aforementioned configuration shown in FIG. 1. So, each cross-connect block performs the cross-connecting with respect to each unit of the ATM cell.

In the cross-connect blocks 203A and 204A, the aforementioned CPU block 101 shown in FIG. 1 normally sends out a test ATM cell. So, when the CPU block 101 detects occurrence of fault, which occurs inside of the cross-connect block 203A or 204A, the cross-connect block 203A or 204A immediately makes a signal 212 or 213 active. The control panel 209 inputs the signals 212 and 213 so as to output control signals 214 and 215, which are placed in an active state. Using the control signals 214 and 215, the control panel 209 controls the tristate buffers 205 and 206. Thus, it is possible to activate a signal (216) which is sent from the ATM cross-connect panel 203 or 204 to the second line card 208; or it is possible to stop sending the signal.

In FIG. 7, for example, the first tristate buffer 205 is made active and is placed in an on-line state. Under such an on-line state of the first tristate buffer 205, the second tristate buffer 206 is stopping output thereof and is placed in an off-line state (or standby state). The signal 216, corresponding to one of outputs of the first and second ATM cross-connect panels 203 and 204, is input to the second line card 208. Incidentally, an interface for the signal 216, like the aforementioned signal 211, conforms with the UTOPIA1 interface.

The second line card 208 performs a pointer process, which is reverse to the pointer process of the first line card 202. Thus, the second line card 208 performs insertion of the overhead section, so that a number of STM-1 signals 207 are output therefrom.

In the ATM cross-connect equipment of FIG. 7, the first and second ATM cross-connect panels 203 and 204 normally perform the aforementioned fault determination. Because the second ATM cross-connect penal 204, which is currently placed in the off-line state, inputs the signal 211 as well, if fault is detected with respect to the first ATM cross-connect panel 203 so that the ATM cross-connect equipment switches over line control from the first ATM cross-connect panel 203 to the second ATM cross-connect panel 204 which is now placed in an on-line state, it is possible to speedily provide the cross-connect service. In order to provide capability of detecting fault while providing the cross-connect service, the cross-connect blocks 203A and 204A normally output test ATM cells so as to monitor operations of the ATM cross-connect panels 203 and 204. So, even if a switchover event occurs between the first and second ATM cross-connect panels 203 and 204, it is possible to suppress (bad) effect to the on-line service.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. An on-line monitor system, which is provided for diagnosis of signal processing blocks that input multiple ATM cell streams for an asynchronous transfer mode within signal frames transmitted thereto over multiple transmission lines in accordance with a synchronous transfer mode so as to perform cross-connecting with respect to each unit of an ATM cell within the multiple ATM cell streams, said on-line line monitor system comprising:

test ATM cell providing means for providing test ATM cells used for fault diagnosis with respect to an operating line, which is placed in an on-line state to be in communication service, as well as a spare line, which is placed in a standby state to be out of communication service, so that the test ATM cells are sequentially input to the signal processing blocks that perform the cross-connecting with respect to each unit of the ATM cell;

test ATM cell separation means for separating the test ATM cells, which are sequentially output from the signal processing blocks, from normal ATM cells; and fault determination means for determining occurrence of fault that occurs in the signal processing blocks by detecting error that occurs in a data section of the separated test ATM cell;

wherein the data section of the test ATM cell comprises a plurality of data sets corresponding to the processing blocks, the plurality of data sets providing fault diagnosis for each of the corresponding signal processing blocks.

2. An on-line monitor system as defined in claim 1 wherein the fault determination means determines occurrence of fault when the data section of the processed test ATM cell which is separated by the ATM cell separation means is not identical to the data section of a test ATM cell which is not input to the signal processing blocks.

3. An on-line line monitor system as defined in claim 1 further comprising:

pileup state detecting means for detecting a pileup state of the normal ATM cells; and adjustment means for adjusting an amount of the test ATM cells, which are sequentially input to the signal processing blocks, in response to the pileup state.

4. An on-line line monitor system which monitors at ATM cross-connect equipment providing signal processing blocks with respect to an operating line system, which is presently placed in an on-line state to be in communication service, and a spare line system, which is placed in a standby state to be out of the communication service, said on-line line monitor system comprising:

test ATM cell incorporating means for incorporating test ATM cells into normal ATM cells which are processed by the signal processing blocks;

test ATM cell monitor means for monitoring processed test ATM cells, which are processed by and sequentially output from the signal processing blocks; and fault determination means for comparing the processed test ATM cell with the test ATM cell so as to determine occurrence of fault in the signal processing blocks;

wherein a data section of the test ATM cell comprises a plurality of data sets corresponding to the processing blocks, the plurality of data sets providing fault diagnosis for each of the corresponding signal processing blocks.

5. An on-line line monitor system as defined in claim 4 further comprising:

line switching means for switching over line control from the operating line system to the spare line system when the fault is detected with respect to the operating line system.

6. An on-line line monitor system as defined in claim 4 wherein the signal processing blocks contain reception-side memory blocks, a SRAM block and transmission-side memory blocks, which are controlled by a CPU block, wherein one of the reception-side memory blocks is used exclusively for inputting the test ATM cell while one of the transmission-side memory blocks is used exclusively for separating the processed test ATM cell from the normal ATM cells which are processed by the signal processing blocks.

7. An on-line line monitor system as defined in claim 6 further comprising:

SRAM block monitor means for monitoring a pileup state of the normal ATM cells in the SRAM block; and adjustment means for adjusting a rate of the test ATM cells, which are sequentially input to one of the reception-side memory blocks, in response to the pileup state.

* * * * *